June 22, 1954 H. K. FARR 2,681,987

TRANSMISSION SYSTEM FOR RADIO ECHO DETECTION SYSTEMS

Filed June 5, 1946

INVENTOR
HAROLD K. FARR

BY M. C. Hayes

ATTORNEY

Patented June 22, 1954 2,681,987

UNITED STATES PATENT OFFICE 2,681,987

TRANSMISSION SYSTEM FOR RADIO ECHO DETECTION SYSTEMS

Harold K. Farr, Stockbridge, Mass., assignor, by mesne assignments, to the United States of America as represented by the Secretary of the Navy Application June 5, 1946, Serial No. 674,438

7 Claims. (Cl. 250—13)

This invention relates to resonant elements and more particularly to combinations of resonant elements for use in anti-transmit-receive (ATR) circuits to reduce received signal losses in radar systems.

It is common practice to use a single antenna for both transmitting and receiving in a radar system. The transmission line from the antenna is provided with a junction one side of which connects the antenna to the transmitter and the other side of which connects the antenna to the receiver. This practice presents two difficulties. The high power output of the transmitter can damage the sensitive input stages of the receiver, and a received signal will divide between the transmitter and the receiver and thereby effectively reduce the sensitivity of the latter. The first of these difficulties is eliminated in practice by means of a transmit-receive (TR) cavity. The TR cavity is coupled to the section of the transmission line between the aforementioned junction and the receiver. An output from the transmitter so affects the impedance of the TR cavity that in combination with the receiver input impedance it presents an infinite impedance at the junction and no damaging power is transmitted toward the receiver. An attempt has been made to eliminate the second of these difficulties by similar means. An anti-transmit-receive (ATR) cavity is coupled to the section of the transmission line between the junction and the transmitter. An output from the transmitter so affects the impedance of the ATR cavity that it presents no obstacle to the transmission of power to the antenna. Between transmission periods, when the radar system is available for signal reception, the impedance of the ATR cavity in combination with the impedance of the transmitter in its cold or off condition presents a high impedance at the junction so that little received power is transmitted towards the transmitter and substantially all is available to the receiver input. A detailed description of the operation of a wave guide system utilizing a transmit-receive switch connected as aforesaid is found in "Principles of Radar" by the Staff of the Massachusetts Institute of Technology Radar School, Technology Press, Cambridge, Massachusetts, First Edition, 1944, particular reference being made to pages 11—22 through 11—25 of this publication. The transmit-receive and anti-transmit-receive switches or cavities may take a variety of forms, a few of which are described on pages 11—25 through 11—34 of this textbook.

A radar system to accept a signal with a pulsed type of modulation pattern must be very broad banded. That is, it must accept a broad band of frequencies on each side of the carrier or center frequency to include all of the side band frequencies which result from pulse modulation. In view of this fact, the ATR cavity heretofore employed has been imperfect because while properly designed for the center frequency, it has been relatively ineffective at the edges of a wide band of frequencies unless provided with a tuning control. Furthermore, the impedance of the transmitter in its cold or off condition has proved to be unpredictable. It varies between transmitters, and in a particular transmitter with temperature and age and a number of complexly related factors. Therefore, prior ATR cavities have the disadvantage that when used under certain conditions and with certain transmitters they do not effectively reduce received signal losses.

Therefore, it is an object of this invention to provide novel ATR apparatus.

It is a further object of this invention to provide such apparatus which will reduce received signal losses over a wide band of frequencies.

It is still a further object of this invention to provide such apparatus which will reduce received signal losses for any value of cold or off impedance of the associated transmitter.

These and other objects will become apparent from a consideration of the following description in conjunction with the accompanying drawing in which.

The three species of this invention herein disclosed all incorporate the novel idea of using two or more conventional ATR cavities with various critical spacings and resonant frequenceis to reduce the received signal losses in broad band radar systems.

Figure 1:
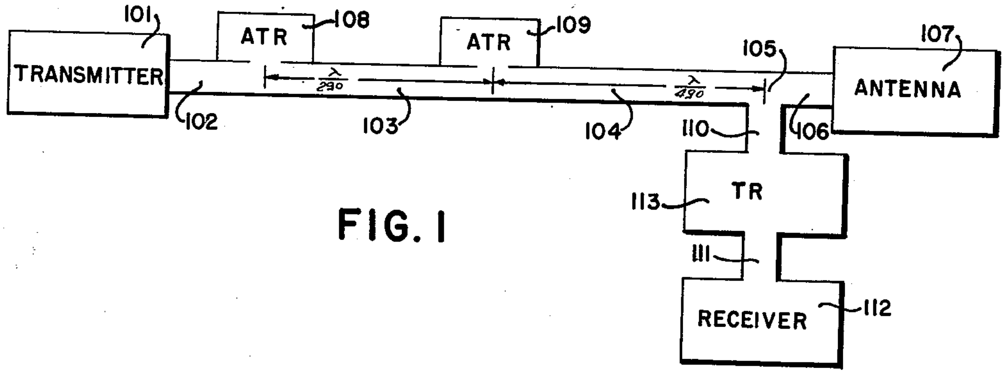
Fig. 1 is a schematic drawing of one embodiment of a first species of this invention.

Fig. 1 discloses one embodiment of a first species of this invention. In this figure, the transmitter 101 is connected to a wave guide consisting of sections 102, 103, 104 and 106 which is terminated at its other end by a suitable antenna 107. The receiver 112 is connected to the main wave guide at junction 105 by wave guide sections 110 and 111 through a conventional transmit-receive switch 113 which may take a variety of forms, a few of which are described in the aforesaid "Principles of Radar." An anti-transmit-receive switch or cavity 109 is connected electrically in series with the main wave guide and is spaced from the junction 105 a distance equal to an odd number of quarter wave lengths in a manner well known to the art. The cavity 109 may also be connected in shunt since a series and shunt cavity are equivalent if each arm of the junction for the cavity is changed in length by a quarter wave length.

In the operation of the system of Fig. 1 thus far described, the transmitter 101 propagates pulsed energy along the main wave guide to be radiated by antenna 107. Transmit-receive switch 113 being located relative to junction 105 in a known manner breaks down and reflects an open circuit to the junction 105 thereby preventing the flow of high power energy from the transmitter 101 to the receiver 112. Echo signals received from remote targets are transmitted by antenna 107 over wave guide 106, and because the transmitter 101 reflects a high impedance at the junction 105 most of the received energy passes to the receiver 112.

As was previously pointed out, the impedance reflected by the transmitter in its "off" condition has been found to be unpredictable with the result that some of the received energy reaches the transmitter. To overcome this difficulty, a single anti-transmit-receive switch 109, resonant at the center frequency and spaced an odd number of quarter wave lengths from the junction 105, in the manner described in the "Principles of Radar," has been used to reflect an open circuit to the junction 105 during periods of reception. This arrangement, being designed for the center frequency of operation of the system, has been found to be relatively ineffective in preventing received signal losses at the edges of the wide band of frequencies encountered in pulsed radar systems.

To make the system more effective for broad band operation, a second anti-transmit-receive switch 108, resonant at the center frequency of operation, is connected in series with the main wave guide between sections 102 and 103, the spacing between switches 108 and 109 being normally an integral number of half wave lengths in electrical length at the center frequency of operation. The addition of switch 108 does not affect the operation during operation of transmitter 101 since the switch presents a short circuit in the wall of the wave guide upon breakdown whereby the transmission of energy to the antenna is uninhibited. During reception, however, the addition of the second switch 108 reduces the signal loss at the wide band frequencies. To insure that all of the received energy reaches the receiver, it is desirable that the transmitter branch of the system presents an infinite impedance at the junction 105. The integral half wave spacing of the two switches 108 and 109 at the center frequency provides substantially infinite impedance at the junction. It will be recognized that the electrical length between the switches varies from a half wave length with frequency, being longer at the high frequency end and shorter at the low frequency end. Accordingly, with an exact half wave length spacing at the center frequency, the signal losses will be greatest at the edges of the frequency band.

To make the system substantially equally effective in reducing signal losses over the entire broad band of operation, the frequency sensitivity of the line separating the two switches 108 and 109 is so selected that the electrical length shifts by just the correct amount during frequency variations between the center frequency and one end of the band so as to produce the smallest loss at the band edges. This selection can be made in a number of ways, one being to choose the best length among the possibilities: $\frac{1}{2}\lambda_{go}$; $\lambda_{go}$; $\frac{3}{2}\lambda_{go}$, etc., all of which are electrically equivalent at the center frequency but which give different results at the band edge ($\lambda_{go}$ being the wave length in the wave guide at the center frequency). The dimensions of the wave guide section 103 may also be selected so that the cut-off wave length of the section has a value which results in the most favorable rate of change of $\lambda_{go}$ with frequency. It can be shown by the use of a Smith impedance chart that there is an optimum electrical length at the frequency band ends which results in low signal losses for all transmitter impedances over the entire band.

Figure 2:
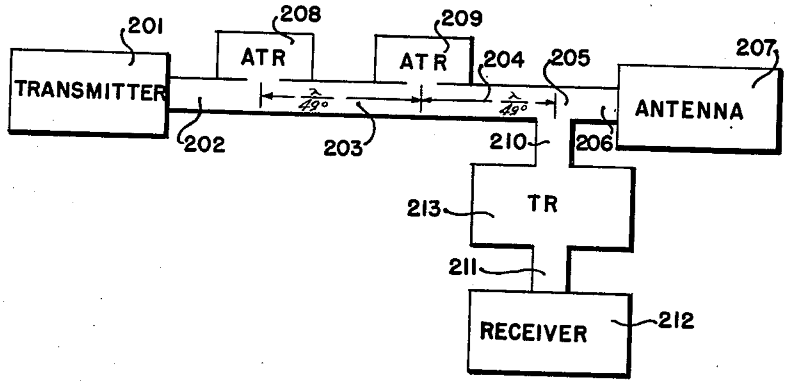
Fig. 2 is a schematic drawing of one embodiment of a second species of this invention.

Fig. 2 discloses one embodiment of a second species of the invention which is identical to that of Fig. 1 with the following exception: (*a*) Wave-guide section 203 between ATR cavities 208 and 209 is equal to an odd number of quarter wave-lengths in electrical length at the center frequency, and (*b*) ATR cavities 208 and 209 are resonant at different frequencies, one near each end of the required frequency pass band. The losses for all transmitter impedances become quite small at each of the two resonant frequencies. By properly choosing these two frequencies so that the maximum losses at the center frequency and at the two ends of the band are about equal, the maximum loss over the entire band is extremely small.

Figure 3:
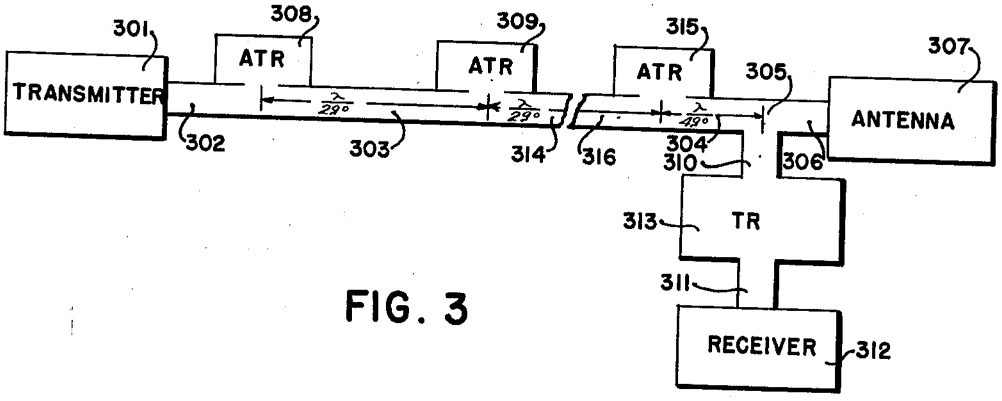
Fig. 3 is a schematic drawing of one embodiment of a third species of this invention.

Fig. 3 discloses one embodiment of a third species of the invention which is identical to that of Fig. 1 with additional ATR cavities spaced at integral number of half wavelength intervals. The resonant frequencies of alternate ATR cavities are adjusted to the same frequency with the resonant frequencies of adjacent ATR cavities being near opposite ends of the required frequency pass band. Although at the center frequency the half wave spacing still gives a loss versus transmitter impedance curve with a broad maximum, the maximum may be made as low as desired by adding additional ATR cavities.

The invention is limited only by the appended claims and in no way by the description herein contained.

What is claimed is:

1. In a radar having a transmitter, a receiver, a single antenna, transmission means for connecting said transmitter, said receiver and said antenna to a common junction, apparatus comprising a first anti-transmit-receive cavity resonant at the center frequency of a predetermined frequency band and a second anti-transmit-receive cavity resonant at the resonant frequency of said first anti-transmit-receive cavity, each of said first and second cavities being coupled to said transmission means between said transmitter and said common junction, the spacing between said first and second cavities being an integral number of half wavelengths in electrical length at said center frequency, the transmission means between said first and second cavities being selected to reduce received signal losses at the ends of said band of frequencies to a minimum.

2. In a radar having a transmitter, a receiver, a single antenna, transmission means for connecting said transmitter, said receiver, and said antenna to a common junction, apparatus comprising a plurality of anti-transmit-receive cavities, each of said cavities being coupled to said transmission means between said transmitter and said common junction, the spacing between successive cavities being an integral number of half wavelengths in electrical length at the radar carrier frequency, alternate cavities being tuned to identical resonant frequencies, adjacent cavities being tuned to resonate at frequencies at the high and low ends of a predetermined frequency band to reduce received signal losses over said band of frequencies substantially independent of transmitter impedance.

3. In a radio echo detection system including a transmitter, a receiver, a single antenna and a branched wave guide system connecting said transmitter, said receiver and said antenna to a common junction, apparatus for causing the transmitter branch of said system to present a high impedance at said junction to received signals over a broad band of frequencies comprising, at least two anti-transmit-receive cavities coupled to the branch wave guide coupling said transmitter to said junction, said cavities being spaced apart at their respective points of coupling to said branch wave guide an integral number of half wave lengths at the center frequency of said broad band of frequencies.

4. In a radio echo detection system including a transmitter, a receiver, a single antenna and a branched wave guide system connecting said transmitter, said receiver and said antenna to a common junction, apparatus for causing the transmitter branch of said system to present a high impedance at said junction to received signals over a broad band of frequencies comprising, at least two anti-transmit-receive cavities coupled to the branch wave guide coupling said transmitter to said junction, said cavities being spaced apart at their respective points of coupling to said branch wave guide an integral number of half wave lengths at the center frequency of said broad band of frequencies, each of said cavities being resonant at said center frequency.

5. In a radio echo detection system including a transmitter, a receiver, a single antenna and a branched wave guide system connecting said transmitter, said receiver and said antenna to a common junction, apparatus for causing the transmitter branch of said system to present a high impedance at said junction to receive signals over a broad band of frequencies comprising, at least two anti-transmit-receive cavities coupled to the branch wave guide coupling said transmitter to said junction, said cavities being spaced apart at their respective points of coupling to said branch wave guide an integral number of half wave lengths at the center frequency of said broad band of frequencies, each of said cavities being resonant at said center frequency, the wave guide between said first and second cavities being selected to have an optimum electrical length at the frequencies at the edges of said broad band to reduce received signal losses at the edges of said band to a minimum.

6. In a radio echo detection system including a transmitter, a receiver, a common antenna and a branched wave guide system connecting said transmitter, said receiver and said antenna to a common junction, apparatus for causing the transmitter branch of said wave guide system to present substantially an infinite impedance at said junction to received signals over a broad band of frequencies comprising, an even multiplicity of anti-transmit-receive cavities coupled to the wave guide system between said transmitter and said junction, the spacing between successive cavities at their respective points of coupling to said branch wave guide being an integral number of half wave lengths at the center frequency of said band of frequencies, alternate ones of said cavities being tuned to the same frequency, adjacent ones of said cavities being tuned to the high and low ends of said bands of frequencies.

7. In a radio echo detection system including a transmitter, a receiver, a common antenna and a branched wave guide system connecting said transmitter, said receiver and said antenna to a common junction, apparatus for causing the transmitter branch of said wave guide system to present substantially an infinite impedance at said junction to received signals over a broad band of frequencies comprising, an even multiplicity of anti-transmit-receive cavities coupled to the wave guide system between said transmitter and said junction, a first of said cavities at its point of coupling to said transmitter branch guide being spaced a quarter wave length at the center frequency of said band from said junction, the remainder of said cavities being spaced between said first switch and said transmitter, the spacing between successive cavities at their respective points of coupling to said transmitter branch guide being an integral number of half wave lengths at said center frequency, alternate ones of said cavities being tuned to the same frequency, adjacent ones of said cavities being tuned to the high and low ends of said band of frequencies.

References Cited in the file of this patent

UNITED STATES PATENTS

| Number | Name | Date |
|---|---|---|
| 2,400,796 | Watts et al. | May 21, 1946 |
| 2,401,717 | Wolff | June 4, 1946 |
| 2,402,625 | Hoffman | June 25, 1946 |
| 2,408,055 | Fiske | Sept. 24, 1946 |
| 2,424,156 | Espley | July 15, 1947 |